US011898123B2

(12) United States Patent
Kneer et al.

(10) Patent No.: US 11,898,123 B2

(45) Date of Patent: Feb. 13, 2024

(54) CLEANING COMPOSITIONS

(71) Applicant: Fujifilm Electronic Materials U.S.A., Inc., N. Kingstown, RI (US)

(72) Inventors: Emil A. Kneer, Mesa, AZ (US); Thomas Dory, Gilbert, AZ (US); Atsushi Mizutani, Shizuoka (JP)

(73) Assignee: Fujifilm Electronic Materials U.S.A., Inc., N. Kingstown, RI (US)

( * ) Notice: Subject to any disclaimer, the term of this patent is extended or adjusted under 35 U.S.C. 154(b) by 231 days.

(21) Appl. No.: 17/458,671

(22) Filed: Aug. 27, 2021

(65) Prior Publication Data

US 2022/0064575 A1 Mar. 3, 2022

Related U.S. Application Data

(60) Provisional application No. 63/152,486, filed on Feb. 23, 2021, provisional application No. 63/070,886, filed on Aug. 27, 2020.

(51) Int. Cl.

| | |
|---|---|
| ***C11D 7/32*** | (2006.01) |
| ***C11D 3/33*** | (2006.01) |
| ***C11D 3/00*** | (2006.01) |
| ***C11D 3/28*** | (2006.01) |
| ***C11D 11/00*** | (2006.01) |
| ***C11D 3/43*** | (2006.01) |
| ***C11D 3/34*** | (2006.01) |

(52) U.S. Cl.

CPC .............. *C11D 3/33* (2013.01); *C11D 3/0047* (2013.01); *C11D 3/0073* (2013.01); *C11D 3/28* (2013.01); *C11D 3/3409* (2013.01); *C11D 3/43* (2013.01); *C11D 11/0047* (2013.01)

(58) Field of Classification Search

CPC .................................................. C11D 11/0047

USPC ......................................................... 510/175

See application file for complete search history.

(56) References Cited

U.S. PATENT DOCUMENTS

| | | | | |
|---|---|---|---|---|
| 2010/0152086 | A1* | 6/2010 | Wu | H01L 21/02063 510/175 |
| 2014/0087313 | A1 | 3/2014 | Ueno et al. | |
| 2015/0307818 | A1 | 10/2015 | Barnes et al. | |
| 2017/0101608 | A1 | 4/2017 | Takahashi et al. | |
| 2017/0128605 | A1 | 5/2017 | Franciskovich et al. | |
| 2020/0035485 | A1 | 1/2020 | Chen et al. | |

OTHER PUBLICATIONS

Notification of Transmittal of The International Search Report and the Written Opinion of the International Searching Authority, or the Declaration, issued in corresponding International Application No. PCT/US21/47981 dated Dec. 16, 2021, 10 pages.

* cited by examiner

*Primary Examiner* — Gregory E Webb

(74) *Attorney, Agent, or Firm* — Fish & Richardson P.C.

(57) ABSTRACT

This disclosure relates to a cleaning composition that contains 1) at least one redox agent; 2) at least one chelating agent, the chelating agent being a polyaminopolycarboxylic acid; 3) at least one corrosion inhibitor, the corrosion inhibitor being a substituted or unsubstituted benzotriazole; 4) at least one sulfonic acid; and 5) water.

39 Claims, 1 Drawing Sheet

FE-8
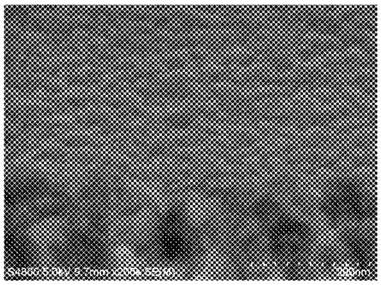
FE-9
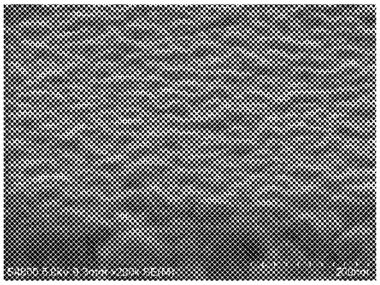
FE-10
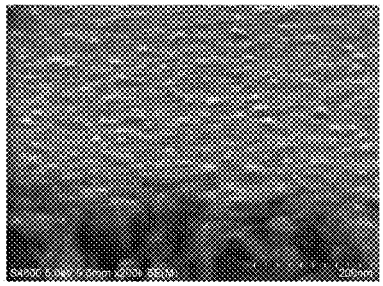
FE-11
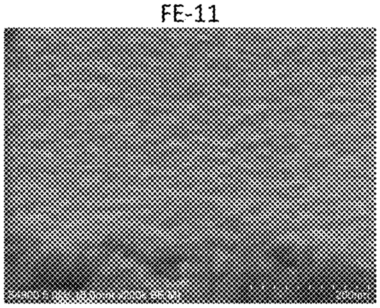
FE-12
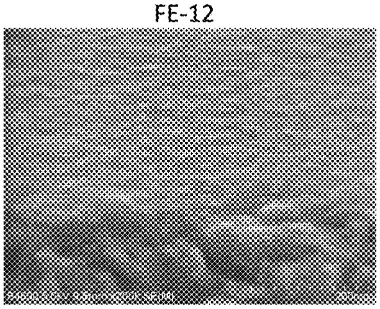

CLEANING COMPOSITIONS

CROSS-REFERENCE TO RELATED APPLICATIONS

The present application claims priority to U.S. Provisional Application Ser. No. 63/152,486, filed on Feb. 23, 2021 and U.S. Provisional Application Ser. No. 63/070,886, filed on Aug. 27, 2020, the contents of which are hereby incorporated by reference in their entirety.

TECHNICAL FIELD

The present disclosure relates to cleaning compositions for semiconductor substrates and methods of cleaning semiconductor substrates. More particularly, the present disclosure relates to cleaning compositions for semiconductor substrates after etching of metal layers or dielectric material layers deposited on the substrates and the removal of residues left on the substrates after bulk resist removal.

BACKGROUND

In the manufacture of integrated circuit devices, photoresists are used as an intermediate mask for transferring the original mask pattern of a reticle onto the wafer substrate by means of a series of photolithography and etching (e.g., plasma etching) steps. One of the essential steps in the integrated circuit device manufacturing process is the removal of the patterned photoresist films from the wafer substrate. In general, this step can be carried out by one of two methods.

One method involves a wet stripping step in which the photoresist-covered substrate is brought into contact with a photoresist stripper solution that consists primarily of an organic solvent and an amine. However, such stripper solutions generally cannot completely and reliably remove the photoresist films, especially if the photoresist films have been exposed to UV radiation and plasma treatments during fabrication. Some photoresist films become highly cross-linked by such treatments and are more difficult to dissolve in a stripper solution. In addition, the chemicals used in these conventional wet-stripping methods are sometimes ineffective for removing inorganic or organometallic residual materials formed during the plasma etching of metal or oxide layers with halogen-containing gases.

An alternative method of removing a photoresist film involves exposing a photoresist-coated wafer to oxygen-based plasma in order to burn the resist film from the substrate in a process known as plasma ashing. However, plasma ashing is also not fully effective in removing the plasma etching by-products noted above. Instead, removal of these plasma etch by-products is typically accomplished by subsequently exposing the processed metal and dielectric thin films to certain cleaning solutions.

Metal-containing substrates are generally susceptible to corrosion. For example, substrates containing materials such as aluminum, copper, aluminum-copper alloy, tungsten nitride, tungsten, cobalt, titanium oxide, other metals and metal nitrides, will readily corrode. Further, dielectrics (e.g., interlayer dielectrics or ultra low-k dielectrics) in the integrated circuit devices can be etched by using conventional cleaning chemistries. In addition, the amount of corrosion tolerated by the integrated circuit device manufacturers is getting smaller and smaller as the device geometries shrink.

At the same time, as residues become harder to remove and corrosion must be controlled to ever lower levels, cleaning solutions should be safe to use and environmentally friendly.

Therefore, the cleaning solutions should be effective for removing the etching and/or ashing residues and should also be non-corrosive to all exposed substrate materials.

SUMMARY

The present disclosure is directed to non-corrosive cleaning compositions that are useful for removing residues (e.g., plasma etch and/or plasma ashing residues) and other materials (e.g., oxidized metals) from a semiconductor substrate as an intermediate step in a multistep manufacturing process. These residues include a range of relatively insoluble mixtures of organic compounds such as residual photoresist; organometallic compounds; metal oxides such as aluminum oxides (AlOx), silicon oxides (SiOx), titanium oxides (TiOx), zirconium oxides (ZrOx), tantalum oxides (TaOx), and hafnium oxides (HfOx) (which can be formed as reaction by-products from exposed metals); metals such as aluminum (Al), aluminum/copper alloy, copper (Cu), titanium (Ti), tantalum (Ta), tungsten (W), and cobalt (Co); doped metals such as tungsten doped with boron (WBx); metal nitrides such as aluminum nitrides (AlN), aluminum oxide nitrides (AlOxNy), silicon nitrides (SiN), titanium nitrides (TiN), tantalum nitrides (TaN), and tungsten nitrides (WN); their alloys; and other materials. An advantage of the cleaning composition described herein is that it can clean a broad range of residues encountered and be generally non-corrosive to exposed substrate materials (e.g., exposed metal oxides (such as AlOx), metals (such as aluminum, aluminum/copper alloy, copper, titanium, tantalum, tungsten, and cobalt), metal nitrides (such as silicon, titanium, tantalum, and tungsten nitrides), and their alloys).

In one aspect, the present disclosure features a cleaning composition comprising (e.g., consisting of or consisting essentially of): 1) at least one redox agent; 2) at least one chelating agent, the chelating agent being a polyaminopolycarboxylic acid; 3) at least one corrosion inhibitor, the corrosion inhibitor being a substituted or unsubstituted benzotriazole; 4) at least one sulfonic acid; and 5) water.

In another aspect, the present disclosure features a method of cleaning residues from a semiconductor substrate. The method includes contacting a semiconductor substrate containing post etch residues and/or post ash residues with a cleaning composition described herein. For example, the method can include the steps of: (A) providing a semiconductor substrate containing post etch and/or post ash residues; (B) contacting said semiconductor substrate with a cleaning composition described herein; (C) rinsing said semiconductor substrate with a suitable rinse solvent; and (D) optionally, drying said semiconductor substrate by any means that removes the rinse solvent and does not compromise the integrity of said semiconductor substrate.

In still another aspect, the present disclosure features a method of cleaning treating a semiconductor substrate having a metal layer on a surface. The method includes (1) oxidizing the metal layer to form an oxidized metal layer, and (2) removing the oxidized metal layer from the semiconductor substrate by contacting a cleaning composition described herein with the oxidized metal layer.

The details of one or more embodiments of the invention are set forth in the description below. Other features, objects, and advantages of the invention will be apparent from the description and the claims.

DESCRIPTION OF DRAWING

FIG. 1 demonstrates the surface roughness after digital etch of blanket Co substrates by formulations FE-8 to FE-12 described in Example 2.

DETAILED DESCRIPTION

As defined herein, unless otherwise noted, all percentages expressed should be understood to be percentages by weight to the total weight of the cleaning composition. Unless otherwise noted, ambient temperature is defined to be between about 16 and about 27 degrees Celsius (° C.), such as 25° C.

As used herein, the terms "layer" and "film" are used interchangeably.

As defined herein, a "water-soluble" substance (e.g., a water-soluble alcohol, ketone, ester, or ether) refers to a substance having a solubility of at least 5% by weight in water at 25° C.

In general, the present disclosure is directed to a cleaning composition (e.g., a non-corrosive cleaning composition) including: 1) at least one redox agent; 2) at least one chelating agent, the chelating agent being a polyaminopolycarboxylic acid; 3) at least one corrosion inhibitor, the corrosion inhibitor being a substituted or unsubstituted benzotriazole; 4) at least one sulfonic acid; and 5) water.

In some embodiments, the compositions of this disclosure contain at least one (e.g., two, three, or four) redox agent, which is believed to aid in the dissolution of residues on the semiconductor surface such as photoresist residues, metal residues, and metal oxide residues. As used herein, the term "redox agent" refers to a compound that can induce an oxidation and/or a reduction in a semiconductor cleaning process. An example of a suitable redox agent is hydroxylamine. In some embodiments, the redox agent or the cleaning composition described herein does not include a peroxide (e.g., hydrogen peroxide).

In some embodiments, the at least one redox agent can be at least about by weight (e.g., at least about 0.2% by weight, at least about 0.3% by weight, at least about 0.4% by weight, at least about 0.5% by weight, at least about 0.6% by weight, at least about 0.7% by weight, at least about 0.8% by weight, at least about 0.9% by weight, or at least about 1% by weight) and/or at most about 5% by weight (e.g., at most about 4.5% by weight, at most about 4% by weight, at most about 3.5% by weight, at most about 3% by weight, at most about 2.5% by weight, at most about 2% by weight, at most about 1.5% by weight, or at most about 1% by weight) of the cleaning compositions of this disclosure.

In some embodiments, the compositions of this disclosure contain at least one (e.g., two, three, or four) chelating agent, which can be a polyaminopolycarboxylic acid. For the purposes of this disclosure, a polyaminopolycarboxylic acid refers to a compound with a plurality of (e.g., two, three, or four) amino groups and a plurality of (e.g., two, three, or four) carboxylic acid groups. Suitable classes of polyaminopolycarboxylic acid chelating agents include, but are not limited to, mono- or polyalkylene polyamine polycarboxylic acids, polyaminoalkane polycarboxylic acids, polyaminoalkanol polycarboxylic acids, and hydroxyalkylether polyamine polycarboxylic acids.

Suitable polyaminopolycarboxylic acid chelating agents include, but are not limited to, butylenediaminetetraacetic acid, diethylenetriaminepentaacetic acid (DTPA), ethylenediaminetetrapropionic acid, triethylenetetraminehexaacetic acid, 1,3-diamino-2-hydroxypropane-N,N,N',N'-tetraacetic acid, propylenediaminetetraacetic acid, ethylenediaminetetraacetic acid (EDTA), trans-1,2-diaminocyclohexane tetraacetic acid, ethylendiamine diacetic acid, ethylendiamine dipropionic acid, 1,6-hexamethylene-diamine-N,N,N',N'-tetraacetic acid, N,N-bis(2-hydroxybenzyl)ethylenediamine-N,N-diacetic acid, diaminopropane tetraacetic acid, 1,4,7,10-tetraazacyclododecane-tetraacetic acid, diaminopropanol tetraacetic acid, and (hydroxyethyl)ethylene-diaminetriacetic acid.

In some embodiments, the compositions of this disclosure include at least about 0.01% by weight (e.g., at least about 0.02% by weight, at least about 0.04% by weight, at least about 0.05% by weight, at least about 0.06% by weight, at least about 0.08% by weight, at least about 0.1% by weight, at least about by weight, at least about 0.14% by weight, at least about 0.15% by weight, at least about 0.16% by weight, at least about 0.18% by weight, or at least about by weight) and/or at most about 0.5% by weight (e.g., at most about 0.45% by weight, at most about 0.4% by weight, at most about 0.35% by weight, at most about 0.3% by weight, at most about 0.25% by weight, or at most about by weight) of the polyaminopolycarboxylic acid chelating agent.

In some embodiments, the cleaning compositions of this disclosure contain at least one (e.g., two, three, or four) corrosion inhibitor. In some embodiments, the corrosion inhibitors can be selected from substituted or unsubstituted benzotriazoles. Without wishing to be bound by theory, it is believed that such cleaning compositions can exhibit significantly improved compatibility with materials (e.g., Co, boron doped tungsten (WBx), tungsten, TiN, SiOx, AlOx, or SiN) that may be present in the semiconductor substrate and should not be removed by the cleaning compositions, when compared to cleaning compositions without any corrosion inhibitor.

Suitable classes of substituted benzotriazole include, but are not limited to, benzotriazoles substituted by at least one substituent selected from the group consisting of alkyl groups, aryl groups, halogen groups, amino groups, nitro groups, alkoxy groups, and hydroxyl groups. Substituted benzotriazoles also include those fused with one or more aryl (e.g., phenyl) or heteroaryl groups.

Suitable benzotriazoles for use as a corrosion inhibitor include, but are not limited to, benzotriazole (BTA), 1-hydroxybenzotriazole, 5-phenylthiol-benzotriazole, 5-chlorobenzotriazole, 4-chlorobenzotriazole, 5-bromobenzotriazole, 4-bromobenzotriazole, 5-fluorobenzotriazole, 4-fluorobenzotriazole, naphthotriazole, tolyltriazole, 5-phenyl-benzotriazole, 5-nitrobenzotriazole, 4-nitrobenzotriazole, 2-(5-amino-pentyl)-benzotriazole, 1-amino-benzotriazole, 5-methyl-1H-benzotriazole (also referred to as 5-methylbenzotriazole or SMBTA), benzotriazole-5-carboxylic acid, 4-m ethylbenzotriazole, 4-ethylbenzotriazole, 5-ethylbenzotriazole, 4-propylbenzotriazole, 5-propylbenzotriazole, 4-isopropylbenzotriazole, 5-isopropylbenzotriazole, 4-n-butylbenzotriazole, 5-n-butylbenzotriazole, 4-isobutylbenzotriazole, 5-isobutylbenzotriazole, 4-pentylbenzotriazole, 5-pentylbenzotriazole, 4-hexylbenzotriazole, 5-hexylbenzotriazole, 5-methoxybenzotriazole, 5-hydroxybenzotriazole, dihydroxypropylbenzotriazole, 1-[N,N-bis(2-ethylhexyl)aminomethyl]-benzotriazole, 5-t-butylbenzotriazole, dimethylpropyl)-benzotriazole, 5-(1',1',3'-trimethylbutyl)benzotriazole, 5-n-octylbenzotriazole, and 5-(1',1',3',3'-tetramethylbutyl)benzotriazole.

In some embodiments, the at least one corrosion inhibitor can be at least about 0.05% by weight (e.g., at least about 0.1% by weight, at least about 0.15% by weight, at least about 0.2% by weight, at least about 0.25% by weight, at least about 0.3% by weight, at least about 0.35% by weight, at least about 0.4% by weight, at least about 0.45% by weight, or at least about 0.5% by weight) and/or at most about 1% by weight (e.g., at most about 0.9% by weight, at most about by weight, at most about 0.7% by weight, at most about 0.6% by weight, at most about 0.5% by weight, at most about 0.4% by weight, at most about 0.3% by weight, at most about 0.2% by weight, or at most about 0.1% by weight) of the cleaning compositions of this disclosure.

In some embodiments, the cleaning compositions of this disclosure include the at least one (e.g., two, three, or four) sulfonic acid. In some embodiments, the at least one sulfonic acid includes a sulfonic acid of formula (I):

$$R—SO_3H \quad (I),$$

in which R is $C_1$-$C_{12}$ alkyl, $C_1$-$C_{12}$ cycloalkyl, or aryl, wherein the alkyl, cycloalkyl, or aryl is optionally substituted by at least one substituent selected from the group consisting of halo, OH, $NH_2$, $NO_2$, COOH, $C_1$-$C_{12}$ cycloalkyl, $C_1$-$C_{12}$ alkoxy optionally substituted by halo, and aryl optionally substituted by OH. In some embodiment, R is $C_1$-$C_4$ alkyl such as methyl, ethyl, propyl, or butyl. As used herein, the term "alkyl" refers to a saturated hydrocarbon group that can be straight-chained or branched. As used herein, the term "cycloalkyl" refers to a saturated cyclic hydrocarbon group. As used herein, the term "aryl" refers to a hydrocarbon group having one or more aromatic rings (e.g., two or more fused aromatic rings). In some embodiments, the aryl group can have 6-10 ring carbons.

Examples of suitable sulfonic acids of include, but are not limited to, methanesulfonic acid, trifluoromethanesulfonic acid, ethanesulfonic acid, trifluoroethanesulfonic acid, perfluoroethylsulfonic acid, perfluoro(ethoxyethane)sulfonic acid, perfluoro(methoxyethane)sulfonic acid, dodecylsulfonic acid, perfluorododecylsulfonic acid, butanesulfonic acid, perfluorobutanesulfonic acid, propanesulfonic acid, perfluoropropanesulfonic acid, octylsulfonic acid, pefluorooctanesulfonic acid, 2-methylpropanesulfonic acid, cyclohexylsulfonic acid, perfluorohexanesulfonic acid, benzylsulfonic acid, hydroxyphenylmethanesulfonic acid, naphthylmethanesulfonic acid, norbornanesulfonic acid, benzenesulfonic acid, chlorobenzenesulfonic acids, bromobenzenesulfonic acids, fluorobenzenesulfonic acids, hydroxybenzenesulfonic acids, nitrobenzenesulfonic acids, 2-hydroxy-5-sulfobenzoic acid, toluenesulfonic acids (e.g., p-toluenesulfonic acid), methylchlorobenzenesulfonic acids, dodecylbenzenesulfonic acids, butylbenzenesulfonic acids, cyclohexylbenzenesulfonic acids, picrylsulfonic acid, dichlorobenzenesulfonic acids, dibromobenzenesulfonic acids, and 2,4,5-trichlorobenzenesulfonic acid.

In some embodiments, the at least one sulfonic acid can be at least about 1% by weight (e.g., at least about 1.2% by weight, at least about 1.4% by weight, at least about 1.5% by weight, at least about 1.6% by weight, at least about 1.8% by weight, at least about 2% by weight, at least about 2.2% by weight, at least about 2.4% by weight, at least about 2.5% by weight, at least about 2.6% by weight, at least about 2.8% by weight, or at least about 3% by weight) and/or at most about 10% by weight (e.g., at most about 9% by weight, at most about 8% by weight, at most about 7% by weight, at most about 6% by weight, at most about 5% by weight, at most about 4% by weight, at most about 3% by weight, or at most about 2% by weight) of the cleaning compositions of this disclosure.

Without wishing to be bound by theory, it is believed that a cleaning composition including the sulfonic acid can minimize surface roughness of the semiconductor substrate treated by the cleaning composition.

In some embodiments, the cleaning compositions of this disclosure can optionally contain at least one (e.g., two, three, or four) pH adjusting agent (e.g., an acid or a base) to control the pH to from about 4 to about 7. In some embodiments, the cleaning compositions of this disclosure can have a pH of at least about 4 (e.g., at least about 4.2, at least about 4.4, at least about 4.5, at least about 4.6, at least about 4.8, or at least about 5) to at most about 7 (e.g., at most about 6.8, at most about 6.6, at most about 6.5, at most about 6.4, at most about 6.2, at most about 6, at most about 5.8, at most about 5.6, or at most about 5.5). Without wishing to be bound by theory, it is believed that a cleaning composition having a pH lower than 4 would increase the etch rate of certain metals (e.g., Co, W, or WBx) or dielectric materials to an undesirable level. Further, without wishing to be bound by theory, it is believed that a cleaning composition having a pH higher than 7 would decrease its etch or ashing residues cleaning capability such that the cleaning would be incomplete. The effective pH can vary depending on the types and amounts of the ingredients used in the cleaning compositions described herein.

The amount of the pH adjusting agent required, if any, can vary as the concentrations of the other components (e.g., the hydroxylamine, the sulfonic acid, and the corrosion inhibitor) are varied in different formulations, and as a function of the molecular weight of the particular pH adjusting agent employed. In some embodiments, the pH adjusting agent can be at least about 0.1% by weight (e.g., at least about 0.2% by weight, at least about 0.4% by weight, at least about 0.5% by weight, at least about 0.6% by weight, at least about 0.8% by weight, at least about 1% by weight, at least about 1.2% by weight, at least about 1.4% by weight, or at least about 1.5% by weight) and/or at most about 3% by weight (e.g., at most about 2.8% by weight, at most about 2.6% by weight, at most about 2.5% by weight, at most about 2.4% by weight, at most about 2.2% by weight, at most about 2% by weight, or at most about 1.8% by weight) of the cleaning compositions of this disclosure. In some embodiments, the pH adjusting agent can be omitted from the cleaning compositions described herein.

In some embodiments, the pH adjusting agent is free of any metal ion (except for a trace amount of metal ion impurities). Suitable metal ion free pH adjusting agents include acids and bases. Suitable acids that can be used as a pH adjusting agent include carboxylic acids. Exemplary carboxylic acid include, but are not limited to, monocarboxylic acids, bicarboxylic acids, tricarboxylic acids, α-hydroxyacids and β-hydroxyacids of monocarboxylic acids, α-hydroxyacids or β-hydroxyacids of bicarboxylic acids, or α-hydroxyacids and β-hydroxyacids of tricarboxylic acids. Examples of suitable carboxylic acid includes citric acid, maleic acid, fumaric acid, lactic acid, glycolic acid, oxalic acid, tartaric acid, succinic acid, or benzoic acid.

Suitable bases that can be used as a pH adjusting agent include ammonium hydroxide, quaternary ammonium hydroxides, monoamines (including alkanolamines), and cyclic amines. Examples of suitable quaternary ammonium hydroxides include, but are not limited to, tetramethyl ammonium hydroxide, tetraethyl ammonium hydroxide, tetrapropyl ammonium hydroxide, tetrabutyl ammonium hydroxide, dimethyldiethylammonium hydroxide, choline, tetraethanolammonium hydroxide, benzyltrimethylammonium hydroxide, benzyltriethylammonium hydroxide, and benzyltributylammonium hydroxide. Examples of suitable monoamines include, but are not limited to, triethylamine, tributylamine, tripentylamine, diethylamine, butylamine, dibutylamine, and benzylamine. Examples of suitable alkanolamines include, but are not limited to, monoethanolamine, diethanolamine, triethanolamine, and aminopropyl-diethanolamine.

In some embodiments, the pH adjusting agent can include a cyclic amine. In some embodiments, the cyclic amine includes a cyclic amine of formula (I):

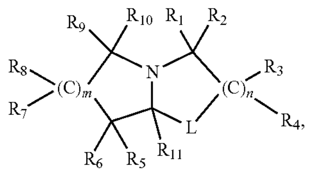

(I)

in which n is 1, 2, or 3; m is 1, 2, or 3; each of $R_1$-$R_{10}$, independently, is H, $C_1$-$C_6$ alkyl, or aryl; and L is —O—, —S—, —N($R^a$)—, or —C($R_aR_b$)—, in which each of $R_a$ and $R_b$, independently, is H, $C_1$-$C_6$ alkyl, or aryl; and Ru is H or together with $R_a$ forms a second bond between L and the C atom to which Rug is attached.

In some embodiments, L in formula (I) is —N($R_a$)—. In such embodiments, n can be 2; m can be 1 or 3; each of $R_1$-$R_{10}$ can be H; and $R_{11}$, together with $R_a$, can form a second bond between L and the C atom to which $R_{11}$ is attached. Examples of such amines include 1,8-diazabicyclo [5.4.0]-7-undecene (DBU;

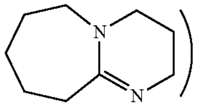 [SMILES: C1CCC2=NCCCN2CC1]

and 1,5-diazabicyclo[4.3.0]-5-nonene (DBN;

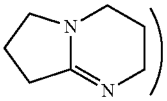

,

In some embodiments, L in formula (I) is —C($R_aR_b$)—. In such embodiments, n can be 2; m can be 2; and each of $R_1$-$R_{11}$ can be H. An example of such amine is octahydro-2H-quinolizine (

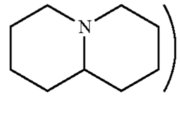

,

Without wishing to be bound by theory, it is believed that the cyclic amine or the alkanolamine described herein can adjust the pH of the cleaning composition, reduce the surface roughness of the semiconductor substrate treated by the cleaning composition, and reduce the corrosion effects of a cleaning composition by lowering the etch rate of such a cleaning composition towards the exposed substrate materials (e.g., exposed metals (such as Co or WBx) or dielectric materials) that are not intended to be removed during the cleaning process.

In some embodiments, the cleaning compositions of the present disclosure can include water. Preferably, the water is de-ionized and ultra-pure, contains no organic contaminants and has a minimum resistivity of about 4 to about 17 mega Ohms. More preferably, the resistivity of the water is at least 17 mega Ohms.

In some embodiments, water can be at least about 55% by weight (e.g., at least about 60% by weight, at least about 65% by weight, at least about 70% by weight, at least about 72% by weight, at least about 75% by weight, at least about 76% by weight, at least about 78% by weight, at least about 80% by weight, at least about 82% by weight, at least about 84% by weight, at least about 85% by weight, at least about 86% by weight, at least about 88% by weight, or at least about 90% by weight) and/or at most about 98% by weight (e.g., at most about 97% by weight, at most about 96% by weight, at most about 95% by weight, at most about 94% by weight, at most about 93% by weight, at most about 92% by weight, at most about 91% by weight, or at most about 90% by weight) of the cleaning compositions of this disclosure.

In some embodiments, the cleaning compositions of this disclosure can optionally contain at least one (e.g., two, three, four, or more) water soluble organic solvent selected from the group consisting of water soluble alcohols, water soluble ketones, water soluble esters, and water soluble ethers (e.g., glycol diethers).

Classes of water soluble alcohols include, but are not limited to, alkane diols (including, but not limited to, alkylene glycols), glycols, alkoxyalcohols (including, but not limited to, glycol monoethers), saturated aliphatic monohydric alcohols, unsaturated non-aromatic monohydric alcohols, and low molecular weight alcohols containing a ring structure. Examples of water soluble alkane diols includes, but are not limited to, 2-methyl-1,3-propanediol, 1,3-propanediol, 2,2-dimethyl-1,3-propanediol, 1,4-butanediol, 1,3-butanediol, 1,2-butanediol, 2,3-butanediol, pinacol, and alkylene glycols. Examples of water soluble alkylene glycols include, but are not limited to, ethylene glycol, propylene glycol, hexylene glycol, diethylene glycol, dipropylene glycol, triethylene glycol, and tetraethylene glycol.

Examples of water soluble alkoxyalcohols include, but are not limited to, 3-methoxy-3-methyl-1-butanol, 3-methoxy-1-butanol, 1-methoxy-2-butanol, and water soluble glycol ethers, such as, glycol monoethers. Examples of water soluble glycol monoethers include, but are not limited to, ethylene glycol monomethyl ether, ethylene glycol monoethyl ether, ethylene glycol mono n-propyl ether, ethylene glycol monoisopropyl ether, ethylene glycol mono n-butyl ether (also referred to as ethylene glycol butyl ether or EGBE), diethylene glycol monomethyl ether, diethylene glycol monoethyl ether, diethylene glycol mono n-propyl ether, diethylene glycol mono n-butyl ether, triethylene glycol monomethyl ether, triethylene glycol monoethyl ether, triethylene glycol mono n-butyl ether, 1-methoxy-2-propanol, 2-methoxy-1-propanol, 1-ethoxy-2-propanol, 2-ethoxy-1-propanol, propylene glycol mono-n-propyl ether, dipropylene glycol monomethyl ether, dipropylene glycol monoethyl ether, dipropylene glycol mono n-propyl ether, tripropylene glycol monoethyl ether, tripropylene glycol monomethyl ether and ethylene glycol monobenzyl ether, and diethylene glycol monobenzyl ether.

Examples of water soluble saturated aliphatic monohydric alcohols include, but are not limited to, methanol, ethanol, n-propyl alcohol, isopropyl alcohol, 1-butanol, 2-butanol, isobutyl alcohol, tert-butyl alcohol, 2-pentanol, t-pentyl alcohol, and 1-hexanol.

Examples of water soluble unsaturated non-aromatic monohydric alcohols include, but are not limited to, allyl alcohol, propargyl alcohol, 2-butenyl alcohol, 3-butenyl alcohol, and 4-penten-2-ol.

Examples of water soluble, low molecular weight alcohols containing a ring structure include, but are not limited to, tetrahydrofurfuryl alcohol, furfuryl alcohol, and 1,3-cyclopentanediol.

Examples of water soluble ketones include, but are not limited to, acetone, cyclobutanone, cyclopentanone, diacetone alcohol, 2-butanone, 2,5-hexanedione, 1,4-cyclohexanedione, 3-hydroxyacetophenone, 1,3-cyclohexanedione, and cyclohexanone.

Examples of water soluble esters include, but are not limited to, ethyl acetate; glycol monoesters such as ethylene glycol monoacetate and diethylene glycol monoacetate; and glycol monoether monoesters such as propylene glycol monomethyl ether acetate, ethylene glycol monomethyl ether acetate, propylene glycol monoethyl ether acetate, and ethylene glycol monoethyl ether acetate.

In some embodiments, the at least one organic solvent can be at least about 0.1% by weight (e.g., at least about 0.2% by weight, at least about 0.4% by weight, at least about 0.5% by weight, at least about 0.6% by weight, at least about 0.8% by weight, at least about 1% by weight, at least about 1.5% by weight, at least about 2% by weight, at least about 2.5% by weight, at least about 3% by weight, at least about 5% by weight, or at least about 10% by weight) and/or at most about 40% by weight (e.g., at most about at most about 38% by weight, at most about 35% by weight, at most about 30% by weight, at most about 25% by weight, at most about 20% by weight, at most about 15% by weight, at most about 10% by weight, at most about 9% by weight, at most about 8% by weight, at most about 6% by weight, at most about 5% by weight, at most about 4% by weight, or at most about 3.5% by weight) of the cleaning compositions of this disclosure.

Without wishing to be bound by theory, it was surprisingly found that including a relatively high amount (e.g., from about 6% to about 36% by weight) of a water soluble glycol monoether (e.g., ethylene glycol mono n-butyl ether) in the cleaning compositions described herein can significantly reduce the surface roughness of the semiconductor substrate treated by the cleaning composition.

In some embodiments, the cleaning compositions of the present disclosure can include hydroxylamine, diethylenetriamine pentaacetic acid, 5-methyl-1H-benzotriazole, 1,8-diazabicyclo[5.4.0]undec-7-ene or monoethanolamine, methanesulfonic acid, and water. In some embodiments, such cleaning compositions can further include ethylene glycol butyl ether.

In some embodiments, the cleaning compositions of the present disclosure can include (1) hydroxylamine in an amount of from about 0.1% to about 5% by weight (e.g., from about 0.5% to about 2% by weight) of the composition; (2) diethylenetriamine pentaacetic acid in an amount of from about 0.01% to about 0.5% by weight (e.g., from about 0.1% to about 0.5% by weight) of the composition; (3) 5-methyl-1H-benzotriazole in an amount of from about 0.05% to about 1% by weight (e.g., from about 0.1% to about 0.5% by weight) of the composition; (4) methanesulfonic acid in an amount of from about 1% to about 10% by weight (e.g., from about 2% to about 5% by weight) of the composition; (5) 1,8-diazabicyclo[5.4.0]undec-7-ene or monoethanolamine in an amount of from about 0.1% to about 3% by weight (e.g., from about 0.5% to about 2% by weight) of the composition; and (6) water in an amount of from about 75% to about 98% (e.g., from about 85% to about 95% by weight) by weight of the composition; in which the composition has a pH of from about 4 to about 7 (e.g., from about 4.5 to about 6). In some embodiments, such cleaning compositions can further include ethylene glycol butyl ether in an amount of from about 0.5% to about 10% by weight (e.g., from about 1% to about 5% by weight) of the composition.

In some embodiments, the cleaning compositions of the present disclosure can include hydroxylamine, diethylenetriamine pentaacetic acid, 5-methyl-1H-benzotriazole, ethylene glycol butyl ether, methanesulfonic acid, and water. In some embodiments, such cleaning compositions do not include a pH adjusting agent.

In some embodiments, the cleaning compositions of the present disclosure can include (1) hydroxylamine in an amount of from about 0.1% to about 5% by weight (e.g., from about 0.5% to about 2% by weight) of the composition; (2) diethylenetriamine pentaacetic acid in an amount of from about 0.01% to about 0.5% by weight (e.g., from about 0.1% to about 0.5% by weight) of the composition; (3) 5-methyl-1H-benzotriazole in an amount of from about 0.05% to about 1% by weight (e.g., from about 0.1% to about 0.5% by weight) of the composition; (4) methanesulfonic acid in an amount of from about 1% to about 10% by weight (e.g., from about 1% to about 5% by weight) of the composition; (5) ethylene glycol butyl ether in an amount of from about 1% to about 40% by weight (e.g., from about 3% to about 40% by weight) of the composition; and (6) water in an amount of from about 55% to about 98% by weight (e.g., from about 55% to about 95% by weight) of the composition; in which the composition has a pH of from about 4 to about 7 (e.g., from about 4.5 to about 6.5).

In addition, in some embodiments, the cleaning compositions of the present disclosure can contain additives such as, additional pH adjusting agents, additional corrosion inhibitors, additional organic solvents, surfactants, biocides, and defoaming agents as optional components. Examples of suitable defoaming agents include polysiloxane defoamers (e.g., polydimethylsiloxane), polyethylene glycol methyl ether polymers, ethylene oxide/propylene oxide copolymers, and glycidyl ether capped acetylenic diol ethoxylates (such as those described in U.S. Pat. No. 6,717,019, herein incorporated by reference).

In some embodiments, the cleaning compositions of the present disclosure can specifically exclude one or more of the additive components, in any combination, if more than one. Such components are selected from the group consisting of polymers, oxygen scavengers, quaternary ammonium compounds (e.g., salts or hydroxides), amines, alkaline bases (such as NaOH, KOH, LiOH, $Mg(OH)_2$, and $Ca(OH)_2$), surfactants, defoamers, fluoride-containing compounds, silicon-containing compounds (e.g., silicates or silanes (e.g., alkoxysilanes)), oxidizing agents (e.g., peroxides, hydrogen peroxide, ferric nitrate, potassium iodate, potassium permanganate, nitric acid, ammonium chlorite, ammonium chlorate, ammonium iodate, ammonium perborate, ammonium perchlorate, ammonium periodate, ammonium persulfate, tetramethylammonium chlorite, tetramethylammonium chlorate, tetramethylammonium iodate, tetramethylammonium perborate, tetramethylammonium perchlorate, tetramethylammonium periodate, tetramethylammonium persulfate, urea hydrogen peroxide, and peracetic acid), abrasives, hydroxycarboxylic acids, carboxylic and polycarboxylic acids (e.g., those lacking amino groups), cyclic compounds (e.g., cyclic compounds containing at least two rings, such as substituted or unsubstituted naphthalenes, or substituted or unsubstituted biphenylethers), chelating agents, corrosion inhibitors (azole or non-azole corrosion inhibitor), buffering agents, guanidine, guanidine salts, acids such as organic acids and inorganic acids (e.g., sulfuric acid, sulfurous acid, nitrous acid, nitric acid, phosphorous acid, and phosphoric acid), pyrrolidone, polyvinyl pyrrolidone, metal salts (e.g., metal halides), and catalysts (e.g., metal-containing catalysts).

The cleaning compositions described herein can be prepared by simply mixing the components together, or can be prepared by blending two compositions in a kit.

In some embodiments, the cleaning compositions of the present disclosure are not specifically designed to remove bulk photoresist films from semiconductor substrates. Rather, the cleaning compositions of the present disclosure can be designed to remove all residues after bulk resist removal by dry or wet stripping methods. Therefore, in some embodiments, the cleaning method of the present disclosure is preferably employed after a dry or wet photoresist stripping process. This photoresist stripping process is generally preceded by a pattern transfer process, such as an etch or implant process, or it is done to correct mask errors before pattern transfer. The chemical makeup of the residue will depend on the process or processes preceding the cleaning step.

Any suitable dry stripping process can be used to remove bulk resist from semiconductor substrates. Examples of suitable dry stripping processes include oxygen based plasma ashing, such as a fluorine/oxygen plasma or a $N_2/H_2$ plasma; ozone gas phase-treatment; fluorine plasma treatment, hot $H_2$ gas treatment (such as that described in U.S. Pat. No. 5,691,117 incorporated herein by reference in its entirety), and the like. In addition, any conventional organic wet stripping solution known to a person skilled in the art can be used to remove bulk resist from semiconductor substrates.

A preferred stripping process used in combination with the cleaning method of the present disclosure is a dry stripping process. Preferably, this dry stripping process is the oxygen based plasma ashing process. This process removes most of the photoresist from the semiconductor substrate by applying a reactive-oxygen atmosphere at elevated temperatures (typically 250° C.) at vacuum conditions (i.e., 1 torr). Organic materials are oxidized by this process and are removed with the process gas. However, this process generally does not remove all inorganic or organometallic contamination from the semiconductor substrate. A subsequent cleaning of the semiconductor substrate with the cleaning composition of the present disclosure is typically necessary to remove those residues.

In some embodiments, the present disclosure features methods of cleaning residues from a semiconductor substrate. Such methods can be performed, for example, by contacting a semiconductor substrate containing post etch residues and/or post ash residues with a cleaning composition described herein. The method can further include rinsing the semiconductor substrate with a rinse solvent after the contacting step and/or drying the semiconductor substrate after the rinsing step. In some embodiments, the semiconductor substrate can further include at least one material (e.g., an exposed material) or a layer of the at least one material, where the material is selected from the group consisting of Cu, Co, W, W doped with boron (B), AlOx, AlN, AlOxNy, Ti, TiN, Ta, TaN, TiOx, ZrOx, HfOx, and TaOx.

In some embodiments, the cleaning method includes the steps of: (A) providing a semiconductor substrate containing post etch and/or post ash residues; (B) contacting the semiconductor substrate with a cleaning composition described herein; (C) rinsing the semiconductor substrate with a suitable rinse solvent; and (D) optionally, drying the semiconductor substrate by any suitable means that removes the rinse solvent and does not compromise the integrity of said semiconductor substrate. In some embodiments, the cleaning method further includes forming a semiconductor device (e.g., an integrated circuit device such as a semiconductor chip) from the semiconductor substrate obtained by the method described above.

In some embodiments, the cleaning method does not substantially remove certain exposed materials on the semiconductor substrate, such as metals (e.g., Co, Cu, W, or W doped with B (WBx)), oxides (e.g., aluminum oxides (AlOx or $Al_2O_3$), silicon oxides (SiOx), zirconium oxide (ZrOx)), nitrides (e.g., TiN or SiN), and poly-Si. For example, in some embodiments, the method removes no more than about 5% by weight (e.g., no more than about 3% by weight, no more than about 1% by weight, no more than about 0.5% by weight, or no more than about 0.1% by weight) of any of the above materials in the semiconductor substrate.

The semiconductor substrates to be cleaned in this method can contain organic and organometallic residues, and additionally, a range of metal oxides that need to be removed. Semiconductor substrates typically are constructed of silicon, silicon germanium, Group III-V compounds like GaAs, or any combination thereof. The semiconductor substrates can additionally contain exposed integrated circuit structures such as interconnect features (e.g., metal lines and dielectric materials). Metals and metal alloys used for interconnect features include, but are not limited to, aluminum, aluminum alloyed with copper, copper, titanium, tantalum, cobalt, and silicon, titanium nitride, tantalum nitride, tungsten, and their alloys. The semiconductor substrate can also contain layers of interlayer dielectrics, silicon oxide, silicon nitride, silicon carbide, titanium oxide, and carbon doped silicon oxides.

The semiconductor substrate can be contacted with a cleaning composition by any suitable method, such as placing the cleaning composition into a tank and immersing and/or submerging the semiconductor substrate into the cleaning composition, spraying the cleaning composition onto the semiconductor substrate, streaming the cleaning composition onto the semiconductor substrate, or any combinations thereof. Preferably, the semiconductor substrates are immersed into the cleaning composition.

The cleaning compositions of the present disclosure can be effectively used up to a temperature of about 90° C. (e.g., from about 25° C. to about 80° C., from about 30° C. to about 60° C., or from about 40° C. to about 60° C.).

Similarly, cleaning times can vary over a wide range depending on the particular cleaning method and temperature employed. When cleaning in an immersion batch type process, a suitable time range is, for example, up to about 60 minutes (e.g., from about 1 minute to about 60 minutes, from about 3 minutes to about 20 minutes, or from about 4 minutes to about 15 minutes).

Cleaning times for a single wafer process can range from about 10 seconds to about 5 minutes (e.g., from about 15 seconds to about 4 minutes, from about 15 seconds to about 3 minutes, or from about 20 seconds to about 2 minutes).

To further promote the cleaning ability of the cleaning compositions of the present disclosure, mechanical agitation means can be employed. Examples of suitable agitation means include circulation of the cleaning composition over the substrate, streaming or spraying the cleaning composition over the substrate, and ultrasonic or megasonic agitation during the cleaning process. The orientation of the semiconductor substrate relative to the ground may be at any angle. Horizontal or vertical orientations are preferred.

The cleaning compositions of the present disclosure can be used in conventional cleaning tools known to those skilled in the art. A significant advantage of the cleaning compositions of the present disclosure is that they include relatively non-toxic, non-corrosive, and non-reactive components in whole and in part, whereby the cleaning compositions are stable in a wide range of temperatures and process times. The cleaning compositions of the present disclosure are chemically compatible with practically all materials used to construct existing and proposed semiconductor wafer cleaning process tools for batch and single wafer cleaning.

Subsequent to the cleaning, the semiconductor substrate can be rinsed with a suitable rinse solvent for about 5 seconds up to about 5 minutes with or without agitation means. Examples of suitable rinse solvents include, but are not limited to, deionized (DI) water, methanol, ethanol, isopropyl alcohol, N-methylpyrrolidinone, gamma-butyrolactone, dimethyl sulfoxide, ethyl lactate and propylene glycol monomethyl ether acetate. Alternatively, aqueous rinses with pH >8 (such as dilute aqueous ammonium hydroxide) can be employed. Preferred examples of rinse solvents include, but are not limited to, dilute aqueous ammonium hydroxide, DI water, methanol, ethanol and isopropyl alcohol. The solvent may be applied using means similar to that used in applying a cleaning composition described herein. The cleaning composition may have been removed from the semiconductor substrate prior to the start of the rinsing step or it may still be in contact with the semiconductor substrate at the start of the rinsing step. Preferably, the temperature employed in the rinsing step is between 16° C. and 27° C.

Optionally, the semiconductor substrate is dried after the rinsing step. Any suitable drying means known in the art can be employed. Examples of suitable drying means include spin drying, flowing a dry gas across the semiconductor substrate, or heating the semiconductor substrate with a heating means such as a hotplate or infrared lamp, Marangoni drying, Rotagoni drying, IPA drying or any combinations thereof. Drying times will be dependent on the specific method employed but are typically on the order of 30 seconds up to several minutes.

In some embodiments, the cleaning compositions described herein can be used to remove an oxidized metal layer from a semiconductor substrate. In some embodiments, the present disclosure features methods of treating a semiconductor substrate having a metal layer on a surface, the method including: (1) oxidizing the metal layer to form an oxidized metal layer, and (2) removing the oxidized metal layer from the semiconductor substrate by contacting a cleaning composition described herein with the oxidized metal layer. This method is also known as a "metal recess process". In some embodiments, the semiconductor substrate can include a metal-based material other than the metal layer or the metal oxidation layer, and a part or all of such a metal-based material can be removed by the oxidizing and removing steps above.

In some embodiments, the metal layer includes a single metal or a mixture of metals (e.g., an alloy). In some embodiments, the metal layer includes cobalt, ruthenium, molybdenum, copper, tungsten, titanium, aluminum, or an alloy thereof.

In some embodiments, the oxidized metal layer includes an oxide of a single metal or an oxide of a metal alloy. In some embodiments, the oxidized metal layer includes cobalt oxide, ruthenium oxide, molybdenum oxide, copper oxide, tungsten oxide, titanium oxide, or aluminum oxide. In some embodiments, the oxidized metal layer can cover at least a portion of the surface of the metal layer or can cover the entire surface of the metal layer.

In some embodiments, the oxidized metal layer can range from a single atom layer to a 10-atom layer. The thickness of a single atom metal or oxidized metal layer is generally at most about 1 nm (e.g., from about 0.3 nm to about 0.4 nm). In some embodiments, the oxidized metal layer can have a thickness of at most about 10 nm (e.g., from about 3 to about 4 nm).

In general, the methods for performing the oxidizing step are not particularly limited and can include a liquid treatment and/or a gas treatment. In some embodiment, the liquid treatment can include contacting a chemical liquid (e.g., an oxidizing chemical liquid) with the metal layer on the semiconductor substrate. In some embodiments, the gas treatment can include contacting an oxidizing gas (e.g., ozone or an ozone-containing gas) with the metal layer on the semiconductor substrate, heating the metal layer on the semiconductor substrate under an oxidizing atmosphere (e.g., in oxygen, an oxygen-containing gas, or the like), or performing plasma treatment on the metal layer on the semiconductor substrate using an oxidizing gas (e.g., an oxygen-containing gas). In some embodiments, a combination of two or more oxidizing methods described above can be used.

In some embodiments, the oxidizing step includes contacting a chemical liquid capable of oxidizing a metal with the metal layer on the semiconductor substrate. In some embodiments, the chemical liquid is different from the cleaning compositions described herein. In some embodiments, the chemical liquid is selected from the group consisting of water, a hydrogen peroxide aqueous solution, an aqueous solution of ammonia and hydrogen peroxide, an aqueous solution of hydrofluoric acid and hydrogen peroxide, an aqueous solution of sulfuric acid and hydrogen peroxide, an aqueous solution of hydrochloric acid and hydrogen peroxide solution, oxygen dissolved water, ozone dissolved water, a perchloric acid aqueous solution, and a sulfuric acid aqueous solution.

In some embodiments, the hydrogen peroxide aqueous solution includes hydrogen peroxide in an amount of from about 0.5% to 31% by weight (e.g., from about 3% to about 15% by weight) of the total weight of the solution.

In some embodiments, the aqueous solution of ammonia and hydrogen peroxide can be formed by mixing an ammonia aqueous solution, a hydrogen peroxide aqueous solution, and water in a weight ratio of from about 1:1:1 to about 1:3:4.5, in which the ammonia aqueous solution includes 28% by weight ammonia and the hydrogen peroxide aqueous solution includes 30% by weight of hydrogen peroxide.

In some embodiments, the aqueous solution of hydrofluoric acid and hydrogen peroxide can be formed by mixing a hydrofluoric acid aqueous solution, a hydrogen peroxide aqueous solution, and water in a weight ratio of from about 1:1:1 to about 1:3:200, in which the hydrofluoric acid aqueous solution includes 49% by weight hydrofluoric acid and the hydrogen peroxide aqueous solution includes 30% by weight of hydrogen peroxide.

In some embodiments, the aqueous solution of sulfuric acid and hydrogen peroxide can be formed by mixing a sulfuric acid aqueous solution, a hydrogen peroxide aqueous solution, and water in a weight ratio of from about 3:1:0 to about 1:1:10, in which the sulfuric acid aqueous solution includes 98% by weight sulfuric acid and the hydrogen peroxide aqueous solution includes 30% by weight of hydrogen peroxide.

In some embodiments, the aqueous solution of hydrochloric acid and hydrogen peroxide can be formed by mixing a hydrochloric acid aqueous solution, a hydrogen peroxide aqueous solution, and water in a weight ratio of from about 1:1:1 to about 1:1:30, in which the hydrochloric acid aqueous solution includes 37% by weight hydrochloric acid and the hydrogen peroxide aqueous solution includes 30% by weight of hydrogen peroxide.

As mentioned herein, the description of from "A:B:C=x:y:z" to "A:B:C=X:Y:Z" satisfies at least one (e.g., two or three) of the ranges of "A:B=x:y" to "A:B=X:Y", "B:C=y:z" to "B:C=Y:Z", and "A:C=x:z" to "A:C=X:Z".

In some embodiments, the oxygen dissolved water contains oxygen in an amount of from about 20 to about 500 ppm by weight of the total weight of the water.

In some embodiments, the ozone dissolved water contains ozone in an amount of from about 1 to about 60 ppm by weight of the total weight of the water.

In some embodiments, the perchloric acid aqueous solution includes perchloric acid in an amount of from about 0.001% to 60% by weight of the total weight of the solution.

In some embodiments, the sulfuric acid aqueous solution includes sulfuric acid in an amount of from about 0.001% to 60% by weight of the total weight of the solution.

In some embodiments, the method of contacting the chemical liquid described herein with the semiconductor substrate to be treated is not particularly limited, and can include immersing the semiconductor substrate to be treated in the chemical liquid in a tank, spraying the chemical liquid on the semiconductor substrate to be treated, flowing the chemical liquid on the semiconductor substrate to be treated, and combinations thereof.

In some embodiments, the contact time between the semiconductor substrate and the chemical liquid in the oxidizing step is from about 0.25 minutes to about 10 minutes (e.g., from about 0.5 minutes to about 5 minutes). In some embodiments, the temperature of the chemical liquid in the oxidizing step is from about 20° C. to about 75° C. (e.g., from about 20° C. to about 60° C.).

In embodiments where gas treatment is used, the oxidizing gas (or atmosphere) in contact with the semiconductor substrate to be treated include an oxygen-containing gas (e.g., dry air or oxygen), an ozone-containing gas (e.g., ozone), and mixtures thereof. In some embodiments, the oxidizing gas can contain one or more gases other than the above-described gas. In some embodiments, the semiconductor substrate to be treated is brought into contact with an oxygen atmosphere, an ozone atmosphere, or a mixture atmosphere containing oxygen and ozone.

In embodiments where gas treatment is used, the semiconductor substrate can be heated (e.g., from about 40° C. to about 200° C.) under an oxidizing atmosphere (e.g., in the presence of oxygen or ozone) or while the semiconductor substrate is in contact with an oxidizing gas (e.g., oxygen, ozone, or a mixture thereof).

In some embodiments, the method of bringing the semiconductor substrate to be treated into contact with a cleaning composition described herein in the removing step is not particularly limited, and can include the same methods described above with respecting contacting the semiconductor substrate with the chemical liquid in the oxidizing step. In some embodiments, the contact time between the semiconductor substrate and the cleaning compositions in the removing step is from about 0.25 minutes to about 10 minutes (e.g., from about 0.5 minutes to about 5 minutes). In some embodiments, the temperature of the cleaning composition in the removing step is from about 20° C. to about 75° C. (e.g., from about 20° C. to about 60° C.).

In some embodiments, the oxidized metal layer can be partially removed or may be completely removed in the removing step. In some embodiments, a portion or all of the metal layer underneath the oxidized metal layer (e.g., the metal layer exposed to the cleaning composition after the oxidized metal layer is removed) can be intentionally or inevitably removed in the removing step. In embodiments when the semiconductor substrate to be treated contain other metal-based materials than the oxidized metal layer and the metal layer, a portion or all of such a metal-based materials can be intentionally or inevitably removed. When the metal layer and/or the metal-based materials other than the metal layer are not removed intentionally, an amount of the metal layer and/or metal-based materials other than the metal layer that are inevitably removed is preferably small.

Without wishing to be bound by theory, it is believed that the oxidized metal layer has a higher solubility to a cleaning composition described herein than a metal layer. Further, without wishing to be bound by theory, it is believed that by oxidizing the surface of the metal layer to form a thin oxidized metal layer, and removing the oxidized metal layer (which can remove a portion of the metal layer under the oxidized metal layer) using a cleaning composition described herein, it is possible to remove (or dissolve) only a thin surface of the metal layer contained in a semiconductor substrate to be treated.

In some embodiments, the cleaning composition used in the removing step can be deaerated in advance to reduce the amount of dissolved oxygen. Without wishing to be bound by theory, it is believed that the metal layer exposed after removing the oxidized metal layer with the cleaning composition can be oxidized to form a new oxidized metal layer by the dissolved oxygen in the cleaning composition and, therefore, such a newly-formed oxidized metal layer can be further removed by the cleaning composition. Thus, without wishing to be bound by theory, it is believed that removing an excessive amount of the metal layer can be suppressed by reducing the dissolved oxygen amount in the cleaning composition.

In addition, without wishing to be bound by theory, it is believed that by repeating the oxidizing and removing steps alternately, the etching amount of the metal layer can be controlled with high accuracy. In some embodiments, alternately performing the oxidizing and removing steps can be performed in at least 1 cycle (e.g., at least 3 cycles or at least 5 cycles) to at most 20 cycles (e.g., at most 15 cycles or at most 10 cycles), in which a combination of the oxidizing and removing steps is defined as one cycle.

In some embodiments, a method of manufacturing an integrated device using a cleaning composition described herein can include the following steps. First, a layer of a photoresist is applied to a semiconductor substrate. The semiconductor substrate thus obtained can then undergo a pattern transfer process, such as an etch or implant process, to form an integrated circuit. The bulk of the photoresist can then be removed by a dry or wet stripping method (e.g., an oxygen based plasma ashing process). Remaining residues on the semiconductor substrate can then be removed using a cleaning composition described herein in the manner described above. The semiconductor substrate can subsequently be processed to form one or more additional circuits on the substrate or can be processed to form into a semiconductor chip by, for example, assembling (e.g., dicing and bonding) and packaging (e.g., chip sealing).

The contents of all publications cited herein (e.g., patents, patent application publications, and articles) are hereby incorporated by reference in their entirety.

EXAMPLES

The present disclosure is illustrated in more detail with reference to the following examples, which are for illustrative purposes and should not be construed as limiting the scope of the present disclosure. Any percentages listed are by weight (wt %) unless otherwise specified. Controlled stirring during testing was done with a 1 inch stirring bar at 300 rpm unless otherwise noted.

General Procedure 1

Formulation Blending

Samples of cleaning compositions were prepared by adding, while stirring, to the calculated amount of organic solvent the remaining components of the formulation. After a uniform solution was achieved, optional additives, if used, were added.

General Procedure 2

Cleaning Evaluation with Beaker Test

The cleaning of PER (Post Etch Residue) from a substrate was carried out with the described cleaning compositions using a multilayered semiconductor substrate of photoresist/TiOx/SiN/Co/ILD (ILD=Inter Layer Dielectric) or photoresist/TiOx/SiN/W/WBx/ILD that had been patterned lithographically, etched in a plasma metal etcher, and followed by oxygen plasma ashing to remove the top layer of photoresist completely.

The test coupons were held using 4" long plastic locking tweezers, whereby the coupon could then be suspended into a 500 ml volume beaker containing approximately 200 milliliters of the cleaning compositions of the present disclosure. Prior to immersion of the coupon into the cleaning composition, the composition was pre-heated to the desired test condition temperature (typically 40° C. or 70° C. as noted) with controlled stirring. The cleaning tests were then carried out by placing the coupon which was held by the plastic tweezers into the heated composition in such a way that the PER layer containing side of the coupon faced the stir bar. The coupon was left static in the cleaning composition for a time period (typically 2 to 5 minutes) while the composition was kept at the test temperature under controlled stirring. When the desired cleaning time was completed, the coupon was quickly removed from the cleaning composition and placed in a 500 ml plastic beaker filled with approximately 400 ml of DI water at ambient temperature (~17° C.) with gentle stirring. The coupon was left in the beaker of DI water for approximately 15 seconds, and then quickly removed, followed by a rinse in isopropanol for about 30 seconds. The coupon was immediately exposed to a nitrogen gas stream from a hand held nitrogen blowing gun, which caused any droplets on the coupon surface to be blown off the coupon, and further, to completely dry the coupon device surface. Following this final nitrogen drying step, the coupon was removed from the plastic tweezers holder and placed into a covered plastic carrier with the device side up for short term storage. The scanning electron microscopy (SEM) images were then collected for key features on the cleaned test coupon device surface.

General Procedure 3a

Materials Compatibility Evaluation with Beaker Test

The blanket Co on silicon substrate, W on silicon substrate, W doped with B (WBx) on silicon substrate, $SiO_2$ on silicon substrate, SiN on silicon substrate, AlOx on silicon substrate, and TiN on silicon substrate were diced into approximately 1 inch×1 inch square test coupons for the materials compatibility tests. The test coupons were initially measured for thickness or sheet resistance by the 4-point probe, CDE Resmap 273 for metallic film (Co, W, and WBx), or by Elipsometry for dielectric film ($SiO_2$, AlOx, SiN and TiN) using a Woollam M-2000X. The test coupons were then installed on the 4" long plastic locking tweezers and treated as described in the cleaning procedure in General Procedure 2 with the Co, W, WBx, $SiO_2$, AlOx, SiN, or TiN layer containing side of the coupon faced the stir bar for 10 minutes.

After the final nitrogen drying step, the coupon was removed from the plastic tweezers holder and placed into a covered plastic carrier. The post-thickness or sheet resistance was then collected on the post-processing test coupon surface by the 4-point probe, CDE Resmap 273 for metallic film (Co, W, and WBx) or by Elipsometry for dielectric film ($SiO_2$, AlOx, SiN and TiN) using a Woollam M-2000X.

General Procedure 3b

Digital Etch Process Using Beaker Test

A blanket Co on silicon substrate was diced into approximately 1 inch×1 inch square test coupons for the digital etch process. The test coupons were initially measured for thickness or sheet resistance by the 4-point probe, CDE Resmap 273 for Co film. The test coupons were then installed on the 4" long plastic locking tweezers and treated as described in the cleaning procedure in General Procedure 2 except that the test coupons were treated with the following treatment cycles five times: (1) deionized water at 40° C. for 30 seconds, (2) the cleaning composition at 25° C. for 30 seconds or 60 seconds, and (3) deionized water rinse. After the above five cycles were completed, the coupons were immediately exposed to a nitrogen gas stream from a hand held nitrogen blowing gun to completely dry the coupon device surface.

After the nitrogen drying step, the coupons were removed from the plastic tweezers holder and placed into a covered plastic carrier. The post-thickness or sheet resistance was then collected on the post-processing test coupon surface by the 4-point probe, CDE Resmap 273 for the Co film.

Example 1

Formulation Examples 1-7 (FE-1 to FE-7) were prepared according to General Procedure 1, and evaluated according to General Procedures 2 and 3a. The formulations are summarized in Table 1 and the cleaning results and the etch rates (ER) (Angstroms/minute) of Co, W, B-doped W (WBx), TiN, $SiO_2$, AlOx, and SiN are summarized in Table 2. The results in Table 2 were obtained at a cleaning temperature of 21° C. within a cleaning time of 10-30 minutes.

TABLE 1

| Ex. | HA | EGBE | DTPA | Corrosion Inhibitor | pH Adjusting agent | MSA | DI Water | Total | PH |
|---|---|---|---|---|---|---|---|---|---|
| FE-1 | 1% | None | 0.2% | 5MBTA 0.35% | MEA 1% | 4.17% | 93.28% | 100.00% | 4.9 |
| FE-2 | 1% | None | 0.2% | 5MBTA 0.35% | DBU 1% | 3.21% | 94.24% | 100.00% | 4.9 |
| FE-3 | 1% | None | 0.2% | 5MBTA 0.35% | DBU 1.79% | 3% | 93.66% | 100.00% | 5.6 |
| FE-4 | 1% | 3% | 0.2% | 5MBTA 0.35% | DBU 1.79% | 3% | 90.66% | 100.00% | 5.6 |
| FE-5 | 1% | None | 0.2% | 5MBTA 0.35% | MEA 1.34% | 3.21% | 93.9% | 100.00% | 5.6 |
| FE-6 | 1% | 3% | 0.2% | 5MBTA 0.35% | MEA 1.34% | 3.21% | 90.9% | 100.00% | 5.6 |
| FE-7 | 2% | 3% | 0.3% | BTA 0.3% | None | 4.48% | 89.92% | 100.00% | 5.57 |

HA = Hydroxylamine; EGBE = Ethylene glycol butyl ether; DTPA = diethylenetriaminepentaacetic acid; 5MBTA = 5-methyl-1H-benzothiazole; BTA = benzothiazole; MEA = Monoethanolamine; DBU = 1,8-diazabicyclo[5.4.0]-7-undecene; and MSA = Methanesulfonic acid.

TABLE 2

| Ex. | Co ER 20 mins (Å/min) | WBx ER 30 mins (Å/min) | W ER 20 mins (Å/min) | TiN ER 10 mins (Å/min) | $SiO_2$ ER 10 mins (Å/min) | AlOx ER 10 mins (Å/min) | SiN ER 10 mins (Å/min) | Cleaning |
|---|---|---|---|---|---|---|---|---|
| FE-1 | 1.3 | 0.4 | 0 | 0 | 0.4 | 0 | 0.4 | Good |
| FE-2 | 1.5 | 0.9 | 0 | 0 | 0.3 | 0 | 0.1 | Good |
| FE-3 | 0 | 1.2 | N/A | N/A | N/A | 0.1 | N/A | Good |
| FE-4 | 0.3 | 1.6 | N/A | N/A | N/A | 0.1 | N/A | Good |
| FE-5 | 0 | 1.3 | N/A | N/A | N/A | 0.1 | N/A | Good |
| FE-6 | 0.2 | 1.6 | N/A | N/A | N/A | 0 | N/A | Good |
| FE-7 | 1 | 2 | 0 | 0 | 0.3 | 0 | 0 | Good |

ER = etch rate; N/A = Not available.

As shown in Tables 1 and 2, formulations FE-1 to FE-6 (which contained monoethanolamine or DBU as a pH adjusting agent) exhibited excellent compatibility (i.e., relatively low etch rates) with at least both Co and WBx that may be exposed in a cleaning process. On the other hand, formulations FE-7 (which did not contain monoethanolamine or DBU) exhibited relatively high etch rates against WBx.

Example 2

Formulation Examples 8-12 (FE-8 to FE-12) were prepared according to General Procedure 1. "Co ER" and "WBx ER" were evaluated according to General Procedure 3a. Digital etch loss for Co was evaluated according to General Procedure 3b.

The formulations and the etching results for Co and WBx are summarized in Table 3 and shown in FIG. 1. The results were obtained at a cleaning temperature of 25° C.

TABLE 3

| | FE-8 | FE-9 | FE-10 | FE-11 | FE-12 |
|---|---|---|---|---|---|
| 5MBTA | 0.35 | 0.35 | 0.35 | 0.35 | 0.35 |
| HA | 1.00 | 1.00 | 1.00 | 1.00 | 1.00 |
| DTPA | 0.20 | 0.20 | 0.20 | 0.20 | 0.20 |
| EGBE | 3.00 | 6.00 | 12.00 | 24.00 | 36.00 |
| MSA | 1.89 | 1.86 | 1.83 | 1.81 | 1.80 |
| DI Water | 93.56 | 90.59 | 84.62 | 72.64 | 60.65 |
| Total | 100.0 | 100.0 | 100.0 | 100.0 | 100.0 |
| pH | 5.6 | 5.6 | 5.6 | 5.6 | 5.6 |
| Liquid appearance | Clear | Clear | Clear | Clear | Clear |

TABLE 3-continued

| | FE-8 | FE-9 | FE-10 | FE-11 | FE-12 |
|---|---|---|---|---|---|
| Process temp. | RT | RT | RT | RT | RT |
| Digital etch loss, 30 s, Co (Å) | 35.5 | 42.3 | 46.2 | 42.7 | 37.8 |
| Digital etch loss, 60 s., Co (Å) | 51.6 | 58.1 | 70.6 | 72.1 | 63.5 |
| Co ER (Å/min, 15 min) | 0.8 | 1.4 | 4.2 | 5.4 | 5.4 |
| WBx ER (Å/min, 15 min) | 2.8 | 2.0 | 1.9 | 3.2 | 1.4 |

As shown in Table 3, formulations FE-8 to FE-12 exhibited a somewhat higher Co etch rate as the amount of EGBE increased from 3 wt % to 36 wt %. In addition, as shown in FIG. 1, formulations FE-8 to FE-12 exhibited a significantly reduced surface roughness as the amount of EGBE increased from 3 wt % to 36 wt %.

Other embodiments are within the scope of the following claims.

What is claimed is:

1. A cleaning composition, comprising:

1) At least one redox agent;

2) At least one chelating agent, the chelating agent being a polyaminopolycarboxylic acid;

3) At least one corrosion inhibitor, wherein the at least one corrosion inhibitor comprises 5-methyl-1H-benzotriazole;

4) At least one sulfonic acid; and 5) water.

2. The composition of claim 1, wherein the at least one redox agent comprises hydroxylamine.

3. The composition of claim 1, wherein the at least one redox agent is from about 0.1% to about 5% by weight of the composition.

4. The composition of claim 1, wherein the polyaminopolycarboxylic acid is selected from the group consisting of mono- or polyalkylene polyamine polycarboxylic acids, polyaminoalkane polycarboxylic acids, polyaminoalkanol polycarboxylic acids, and hydroxyalkylether polyamine polycarboxylic acids.

5. The composition of claim 4, wherein the polyaminopolycarboxylic acid is diethylenetriamine pentaacetic acid.

6. The composition of claim 1, wherein the polyaminopolycarboxylic acid is from about 0.01% to about 0.5% by weight of the composition.

7. The composition of claim 1, wherein the at least one corrosion inhibitor is from about 0.05% to about 1% by weight of the composition.

8. The composition of claim 1, wherein the at least one sulfonic acid comprising a sulfonic acid of formula (I):

$$R{-}SO_3H \quad (I),$$

in which R is $C_1$-$C_{12}$ alkyl, $C_1$-$C_{12}$ cycloalkyl, or aryl, wherein the alkyl, cycloalkyl, or aryl is optionally substituted by at least one substituent selected from the group consisting of halo, OH, $NH_2$, $NO_2$, COOH, $C_1$-$C_{12}$ cycloalkyl, $C_1$-$C_{12}$ alkoxy optionally substituted by halo, and aryl optionally substituted by OH.

9. The composition of claim 8, wherein the at least one sulfonic acid comprises methanesulfonic acid.

10. The composition of claim 1, wherein the at least one sulfonic acid is from about 1% to about 10% by weight of the composition.

11. The composition of claim 1, further comprising at least one pH adjusting agent, the pH adjusting agent being a base free of a metal ion.

12. The composition of claim 11, wherein the at least one pH adjusting agent comprises a cyclic amine or an alkanolamine.

13. The composition of claim 11, wherein the at least one pH adjusting agent comprises 1,8-diazabicyclo[5.4.0]undec-7-ene or monoethanolamine.

14. The composition of claim 11, wherein the at least one pH adjusting agent is from about 0.1% to about 3% by weight of the composition.

15. The composition of claim 1, wherein the water is from about 55% to about 98% by weight of the composition.

16. The composition of claim 1, further comprising at least one organic solvent selected from the group consisting of water soluble alcohols, water soluble ketones, water soluble esters, and water soluble ethers.

17. The composition of claim 16, wherein the at least one organic solvent comprises ethylene glycol butyl ether.

18. The composition of claim 16, wherein the at least one organic solvent is from about 0.1% to about 40% by weight of the composition.

19. The composition of claim 1, wherein the composition has a pH of from about 4 to about 7.

20. The composition of claim 1, wherein the composition comprises hydroxylamine, diethylenetriamine pentaacetic acid, 5-methyl-1H-benzotriazole, 1,8-diazabicyclo[5.4.0]undec-7-ene, methanesulfonic acid, and water.

21. The composition of claim 20, wherein the composition comprises:

hydroxylamine in an amount of from about 0.1% to about 5% by weight of the composition;

diethylenetriamine pentaacetic acid in an amount of from about 0.01% to about 0.5% by weight of the composition;

5-methyl-1H-benzotriazole in an amount of from about 0.05% to about 1% by weight of the composition;

methanesulfonic acid in an amount of from about 1% to about 10% by weight of the composition;

1,8-diazabicyclo[5.4.0]undec-7-ene in an amount of from about 0.1% to about 3% by weight of the composition; and water in an amount of from about 75% to about 98% by weight of the composition;

wherein the composition has a pH of from about 4 to about 7.

22. The composition of claim 21, wherein the composition comprises:

hydroxylamine in an amount of from about 0.5% to about 2% by weight of the composition;

diethylenetriamine pentaacetic acid in an amount of from about 0.1% to about 0.5% by weight of the composition;

5-methyl-1H-benzotriazole in an amount of from about 0.1% to about 0.5% by weight of the composition;

methanesulfonic acid in an amount of from about 2% to about 5% by weight of the composition;

1,8-diazabicyclo[5.4.0]undec-7-ene in an amount of from about 0.5% to about 2% by weight of the composition; and water in an amount of from about 85% to about 95% by weight of the composition;

wherein the composition has a pH of from about 4.5 to about 6.

23. The composition of claim 20, further comprising ethylene glycol butyl ether.

24. The composition of claim 23, wherein the composition comprises:

hydroxylamine in an amount of from about 0.1% to about 5% by weight of the composition;

diethylenetriamine pentaacetic acid in an amount of from about 0.01% to about 0.5% by weight of the composition;

5-methyl-1H-benzotriazole in an amount of from about 0.05% to about 1% by weight of the composition;

methanesulfonic acid in an amount of from about 1% to about 10% by weight of the composition;

1,8-diazabicyclo[5.4.0]undec-7-ene in an amount of from about 0.1% to about 3% by weight of the composition;

ethylene glycol butyl ether in an amount of from about 0.5% to about 10% by weight of the composition; and water in an amount of from about 75% to about 98% by weight of the composition;

wherein the composition has a pH of from about 4 to about 7.

25. The composition of claim 24, wherein the composition comprises:

hydroxylamine in an amount of from about 0.5% to about 2% by weight of the composition;

diethylenetriamine pentaacetic acid in an amount of from about 0.1% to about 0.5% by weight of the composition;

5-methyl-1H-benzotriazole in an amount of from about 0.1% to about 0.5% by weight of the composition;

methanesulfonic acid in an amount of from about 2% to about 5% by weight of the composition;

1,8-diazabicyclo[5.4.0]undec-7-ene in an amount of from about 0.5% to about 2% by weight of the composition;

ethylene glycol butyl ether in an amount of from about 1% to about 5% by weight of the composition; and water in an amount of from about 85% to about 95% by weight of the composition;

wherein the composition has a pH of from about 4.5 to about 6.

26. The composition of claim 1, wherein the composition comprises hydroxylamine, diethylenetriamine pentaacetic acid, 5-methyl-1H-benzotriazole, monoethanolamine, methanesulfonic acid, and water.

27. The composition of claim 26, wherein the composition comprises:

hydroxylamine in an amount of from about 0.1% to about 5% by weight of the composition;

diethylenetriamine pentaacetic acid in an amount of from about 0.01% to about 0.5% by weight of the composition;

5-methyl-1H-benzotriazole in an amount of from about 0.05% to about 1% by weight of the composition;

methanesulfonic acid in an amount of from about 1% to about 10% by weight of the composition;

monoethanolamine in an amount of from about 0.1% to about 3% by weight of the composition; and water in an amount of from about 75% to about 98% by weight of the composition;

wherein the composition has a pH of from about 4 to about 7.

28. The composition of claim 27, wherein the composition comprises:

hydroxylamine in an amount of from about 0.5% to about 2% by weight of the composition;

diethylenetriamine pentaacetic acid in an amount of from about 0.1% to about 0.5% by weight of the composition;

5-methyl-1H-benzotriazole in an amount of from about 0.1% to about 0.5% by weight of the composition;

methanesulfonic acid in an amount of from about 2% to about 5% by weight of the composition;

monoethanolamine in an amount of from about 0.5% to about 2% by weight of the composition; and water in an amount of from about 85% to about 95% by weight of the composition;

wherein the composition has a pH of from about 4.5 to about 6.

29. The composition of claim 26, further comprising ethylene glycol butyl ether.

30. The composition of claim 29, wherein the composition comprises:

hydroxylamine in an amount of from about 0.1% to about 5% by weight of the composition;

diethylenetriamine pentaacetic acid in an amount of from about 0.01% to about 0.5% by weight of the composition;

5-methyl-1H-benzotriazole in an amount of from about 0.05% to about 1% by weight of the composition;

methanesulfonic acid in an amount of from about 1% to about 10% by weight of the composition;

monoethanolamine in an amount of from about 0.1% to about 3% by weight of the composition;

ethylene glycol butyl ether in an amount of from about 0.5% to about 10% by weight of the composition; and water in an amount of from about 75% to about 98% by weight of the composition;

wherein the composition has a pH of from about 4 to about 7.

31. The composition of claim 30, wherein the composition comprises:

hydroxylamine in an amount of from about 0.5% to about 2% by weight of the composition;

diethylenetriamine pentaacetic acid in an amount of from about 0.1% to about 0.5% by weight of the composition;

5-methyl-1H-benzotriazole in an amount of from about 0.1% to about 0.5% by weight of the composition;

methanesulfonic acid in an amount of from about 2% to about 5% by weight of the composition;

monoethanolamine in an amount of from about 0.5% to about 2% by weight of the composition;

ethylene glycol butyl ether in an amount of from about 1% to about 5% by weight of the composition; and water in an amount of from about 85% to about 95% by weight of the composition;

wherein the composition has a pH of from about 4.5 to about 6.

32. The composition of claim 1, wherein the composition comprises hydroxylamine, diethylenetriamine pentaacetic acid, 5-methyl-1H-benzotriazole, ethylene glycol butyl ether, methanesulfonic acid, and water.

33. The composition of claim 32, wherein the composition comprises:

hydroxylamine in an amount of from about 0.1% to about 5% by weight of the composition;

diethylenetriamine pentaacetic acid in an amount of from about 0.01% to about 0.5% by weight of the composition;

5-methyl-1H-benzotriazole in an amount of from about 0.05% to about 1% by weight of the composition;

methanesulfonic acid in an amount of from about 1% to about 10% by weight of the composition;

ethylene glycol butyl ether in an amount of from about 1% to about 40% by weight of the composition; and water in an amount of from about 55% to about 98% by weight of the composition;

wherein the composition has a pH of from about 4 to about 7.

34. The composition of claim 33, wherein the composition comprises:

hydroxylamine in an amount of from about 0.5% to about 2% by weight of the composition;

diethylenetriamine pentaacetic acid in an amount of from about 0.1% to about 0.5% by weight of the composition;

5-methyl-1H-benzotriazole in an amount of from about 0.1% to about 0.5% by weight of the composition;

methanesulfonic acid in an amount of from about 1% to about 5% by weight of the composition;

ethylene glycol butyl ether in an amount of from about 3% to about 40% by weight of the composition; and water in an amount of from about 55% to about 95% by weight of the composition;

wherein the composition has a pH of from about 4.5 to about 6.5.

35. A method of cleaning residues from a semiconductor substrate, comprising:

contacting a semiconductor substrate containing post etch residues and/or post ash residues with the cleaning composition of claim 1.

36. A method of treating a semiconductor substrate having a metal layer on a surface, comprising:

oxidizing the metal layer to form an oxidized metal layer, and removing the oxidized metal layer from the semiconductor substrate by contacting the cleaning composition of claim 1 with the oxidized metal layer.

37. The method of claim 36, wherein the metal layer comprises cobalt, ruthenium, molybdenum, copper, tungsten, titanium, aluminum, or an alloy thereof.

38. The method of claim 36, wherein the oxidizing step comprises contacting a chemical liquid with the metal layer on the semiconductor substrate, in which the chemical liquid is selected from the group consisting of water, a hydrogen peroxide aqueous solution, an aqueous solution of ammonia and hydrogen peroxide, an aqueous solution of hydrofluoric acid and hydrogen peroxide, an aqueous solution of sulfuric acid and hydrogen peroxide, an aqueous solution of hydrochloric acid and hydrogen peroxide, oxygen dissolved water, ozone dissolved water, a perchloric acid aqueous solution, and a sulfuric acid aqueous solution.

39. The method of claim 36, wherein the oxidizing step comprises contacting an oxidizing gas with the metal layer, heating the metal layer under an oxidizing atmosphere, or performing plasma treatment on the metal layer using an oxidizing gas.

* * * * *